(12) United States Patent
Banjo et al.

(10) Patent No.: US 10,836,069 B2
(45) Date of Patent: Nov. 17, 2020

(54) VALVE ASSEMBLY FOR LOG SPLITTING APPARATUS

(71) Applicant: Frictionless World LLC, Westminster, CO (US)

(72) Inventors: Daniel Banjo, Boulder, CO (US); Benjamin Zywicki, Louisville, CO (US)

(73) Assignee: Frictionless World, LLC, Westminster, CO (US)

( * ) Notice: Subject to any disclaimer, the term of this patent is extended or adjusted under 35 U.S.C. 154(b) by 90 days.

(21) Appl. No.: 16/213,621

(22) Filed: Dec. 7, 2018

(65) Prior Publication Data

US 2020/0180184 A1 Jun. 11, 2020

(51) Int. Cl.
*B27L 7/06* (2006.01)
*F16K 31/60* (2006.01)
*B27M 1/08* (2006.01)
*B27B 29/00* (2006.01)

(52) U.S. Cl.
CPC ............... *B27L 7/06* (2013.01); *B27M 1/08* (2013.01); *F16K 31/60* (2013.01); *B27B 29/00* (2013.01)

(58) Field of Classification Search
CPC ................ B27L 7/00; B27L 7/06; B27L 7/08
See application file for complete search history.

(56) References Cited

U.S. PATENT DOCUMENTS

| | | | |
|---|---|---|---|
| 3,077,214 A | 2/1963 | Brukner | |
| 4,829,865 A | 5/1989 | Nunnery et al. | |
| 5,337,810 A * | 8/1994 | McCormack | B27L 7/00 144/193.1 |
| 7,913,726 B1 * | 3/2011 | Honnell | B27L 7/06 144/193.1 |
| 8,006,725 B2 * | 8/2011 | Majkrzak | B27L 7/00 144/193.2 |
| 2006/0060262 A1 | 3/2006 | Hicks | |
| 2009/0229709 A1 | 9/2009 | Babcock | |
| 2013/0098503 A1 * | 4/2013 | Shaeffer | B27L 7/00 144/195.1 |
| 2016/0346851 A1 | 12/2016 | Maki-Haapoja et al. | |

OTHER PUBLICATIONS

International Searching Authority, U.S. Patent and Trademark Office, International Search Report and Written Opinion for PCT/US2019/065262, dated Feb. 3, 2020, 11 pages.

* cited by examiner

*Primary Examiner* — Matthew Katcoff
(74) *Attorney, Agent, or Firm* — Holzer Patel Drennan

(57) ABSTRACT

A system for a log splitter that is configured to automatically remove power to a pump and motor assembly for a hydraulic actuator when a valve assembly is in a position other than a first position causing the splitting assembly to advance in a first direction or a second position causing the splitting assembly to advance in an opposite first direction. The system incorporates one or more sensors (e.g., transducers) configured to detect different positions of the valve assembly and generate signals that may be processed by a system controller to respectively allow power to flow to or disallow power from flowing to the fluid pump. The disclosed system advantageously results in reduced overall power consumption and noise levels.

15 Claims, 5 Drawing Sheets

VALVE ASSEMBLY FOR LOG SPLITTING APPARATUS

FIELD

The present invention generally relates to the field of wood or log splitting apparatuses.

BACKGROUND

The continued popularity of wood as a source of heat has led to increasing use of powered apparatuses for wood splitting purposes. Many different forms of mechanical wood splitters have been developed. One common design includes a blade and foot plate that are spaced apart for the receipt of a log on a cradle member therebetween. One of the blade and foot plate is driven toward the other (e.g., by a drive assembly) to drive the blade through the log to split the same into two or more pieces.

SUMMARY

Generally, a user manipulates a triggering member (e.g., handle, button, switch) of the valve assembly of the log splitter to linearly move one of the blade member or foot plate towards and away from the other of the blade member or foot plate to split logs or other pieces of wood placed therebetween. As used herein, the term "splitting assembly" refers to the one of the blade member or foot plate that is moving towards and away from the other of the blade member or foot plate that is fixed on the frame of the log splitting device or apparatus (the "fixed member"). The splitting assembly may additionally include the piston or other member of the drive mechanism or assembly that is driving or moving the one of the blade member or foot plate towards and away from the fixed member.

For instance, manipulating a triggering member of the log splitter into a first position triggers the apparatus to pump hydraulic fluid into a first chamber of a hydraulic cylinder and out of a second chamber of the hydraulic cylinder to drive the splitting assembly in a first direction towards one of a fully retracted positioned away from the fixed member or a fully extended position adjacent the fixed member. Specifically, manipulating the trigging member into the first position moves a valve assembly into a first configuration of fluid passageways that allows hydraulic fluid to be pumped into the first chamber and out of the second chamber. To move the splitting assembly in the opposite second direction towards the other of the fully retracted or fully extended positions, the user manipulates the triggering member into a second position (e.g., opposite the intermediate position from the first handle position) to move a valve assembly into a different second configuration of fluid passageways that allows the apparatus to pump hydraulic fluid into the second chamber of the hydraulic cylinder and out of the first chamber of the hydraulic cylinder and drive the splitting assembly in the second direction towards the other of the fully retracted or fully extended positions (e.g., via moving the valve assembly into a corresponding second configuration or position). To stop the splitting assembly at a position between the fully retracted and fully extended positions (i.e., to shorten the stroke), the user typically must manually manipulate the triggering member into a third position (e.g., between the first and second positions) to trigger the apparatus to stop pumping hydraulic fluid into either of the first or second chambers of the hydraulic cylinder and allow the engine or motor powering the fluid pump to idle (e.g., via moving the valve assembly into a corresponding third configuration or position). The log splitter typically often includes any appropriate controller (e.g., control board) including one or more processors that are configured to execute various sets of computer readable instructions to control operation of the pump and motor assembly as appropriate (e.g., power ramping the motor, etc.).

In existing log splitters, the engine and/or motor powering the fluid pump often continue to operate when the triggering member is positioned to stop the splitting assembly from moving in either of the first or second opposite directions (e.g., when it is in the third position). However, this arrangement results in increased power consumption and noise among other inefficiencies.

In this regard, disclosed herein is a system for a log splitter that is configured to automatically remove power to the motor powering the fluid pump when a valve assembly is in a position other than a first position causing the splitting assembly to advance in a first direction or a second position causing the splitting assembly to advance in an opposite first direction. Stated differently, the disclosed system is configured to cut power to the fluid pump motor when the valve assembly is manipulated into an "idle" position that prevents the splitting assembly from moving in either of the first or second directions. As will be discussed in more detail herein, a log splitting apparatus incorporates one or more sensors (e.g., transducers) that are configured to detect when the valve assembly is in either of the first and second positions, on the one hand, and in any other position, on the other hand. The one or more sensors are then configured to generate signals based on the detected positions that are used to trigger a system controller (e.g., control board) to allow power to be sent (e.g., from a battery bank) to the fluid pump motor when the valve assembly is in either of the first and second positions or to disallow power from being sent to the fluid pump motor when the triggering member is in other than the first and second positions.

In one arrangement, first and second sensors of any appropriate type (e.g., contact, hall-effect, piezoelectric, proximity, etc.) may be respectively positioned adjacent the first and second positions of the triggering member of the valve assembly to detect when the triggering member is in either of the first and second positions. Upon either of the first or second sensors detecting the triggering member, the particular sensor may be configured to generate a signal that may be detected and received by a system controller in any appropriate manner which may process the signal to allow the power source to send power to the fluid pump motor. If neither of the first or second sensors detects the triggering member and thus not generating a signal, the system controller may not allow the power source to send power to the fluid pump motor. In another arrangement, one or more sensors may be positioned adjacent a path taken by the trigging member between the first and second positions to detect when the trigging member is in other than the first or second position. Upon such one or more sensors detecting the triggering member, the one or more sensors may be configured to generate a signal that may be detected and received by the system controller in any appropriate manner which may process the signal to disallow the power source from sending power to the fluid pump motor. As an alternative to the trigging member, the one or more sensors may also be positioned adjacent the first and second positions of the valve assembly itself.

In one aspect, an apparatus for splitting logs includes a frame including a cradle disposed over an upper portion thereof for receiving a log; a splitting assembly that is linearly translatable over the upper portion of the frame along a translation axis in a first direction for use in splitting a log received in the cradle and in an opposite second direction; a hydraulic cylinder relative to which a piston is configured to linearly translate to induce linear translation of the splitting assembly; a pump and motor assembly interconnected with the cylinder to pump hydraulic fluid into a first chamber of the cylinder to translate the piston in the first direction and into a second chamber of the cylinder to translate the piston in the second direction; a power source interconnected with the pump and motor assembly; and a valve assembly interconnected with the hydraulic cylinder. The valve assembly includes a movable member that is positionable in a) a first position to allow hydraulic fluid to flow from the pump and motor assembly into the first chamber of the hydraulic cylinder and from the second chamber of the hydraulic cylinder to the pump and motor assembly, b) a second position to allow hydraulic fluid to flow from the pump and motor assembly into the second chamber of the hydraulic cylinder and from the first chamber of the hydraulic cylinder to the pump and motor assembly, and c) a third position that prevents hydraulic fluid from flowing into either of the first or second chambers of the hydraulic cylinder; and a sensor assembly, positioned relative to the movable member, that is configured to detect when the movable member is in a) the first or second positions, or b) the third position and generate a signal based on the detection. The log splitting apparatus also includes a system controller that is configured to allow the power source to send power to the motor or disallow the power source from sending power to the motor based on the signals generated by the sensor assembly In another aspect, a method of using a log splitting apparatus includes first ascertaining, by a system controller of a log splitting apparatus, that a valve assembly of the apparatus is in a position that inhibits hydraulic fluid from being pumped from a fluid pump into a hydraulic cylinder that is configured to drive a splitting assembly over an upper portion of a frame of the apparatus; and disallowing, by the system controller in response to the first ascertaining, power from being supplied to a motor that drives the fluid pump.

Any of the embodiments, arrangements, and the like discussed herein may be used (either alone or in combination with other embodiments, arrangement, and the like) with any of the disclosed aspects. Any feature disclosed herein that is intended to be limited to a "singular" context or the like will be clearly set forth herein by terms such as "only," "single," "limited to," or the like. Merely introducing a feature in accordance with commonly accepted antecedent basis practice does not limit the corresponding feature to the immediately previous occurrence of the feature. Moreover, any failure to use phrases such as "at least one" also does not limit the corresponding feature to the singular. Use of the phrase "generally," "at least generally," "substantially," "at least substantially" or the like in relation to a particular feature encompasses the corresponding characteristic and insubstantial variations thereof. Finally, a reference of a feature in conjunction with the phrase "in one embodiment" or the like does not limit the use of the feature to a single embodiment.

Reference will now be made to the following drawings, which assist in illustrating the various pertinent features of the various novel aspects of the present disclosure.

DETAILED DESCRIPTION

The present disclosure is directed to a system for a log splitter that is configured to automatically remove power to a pump and motor assembly for a hydraulic actuator when a valve assembly is in a position other than a first position causing the splitting assembly to advance in a first direction or a second position causing the splitting assembly to advance in an opposite first direction. The system incorporates one or more sensors (e.g., transducers) configured to detect different positions of the valve assembly and generate signals that may be processed by a system controller to respectively allow power to flow to or disallow power from flowing to the pump and motor assembly. The disclosed system advantageously results in reduced overall power consumption and noise levels.

Figure 1:
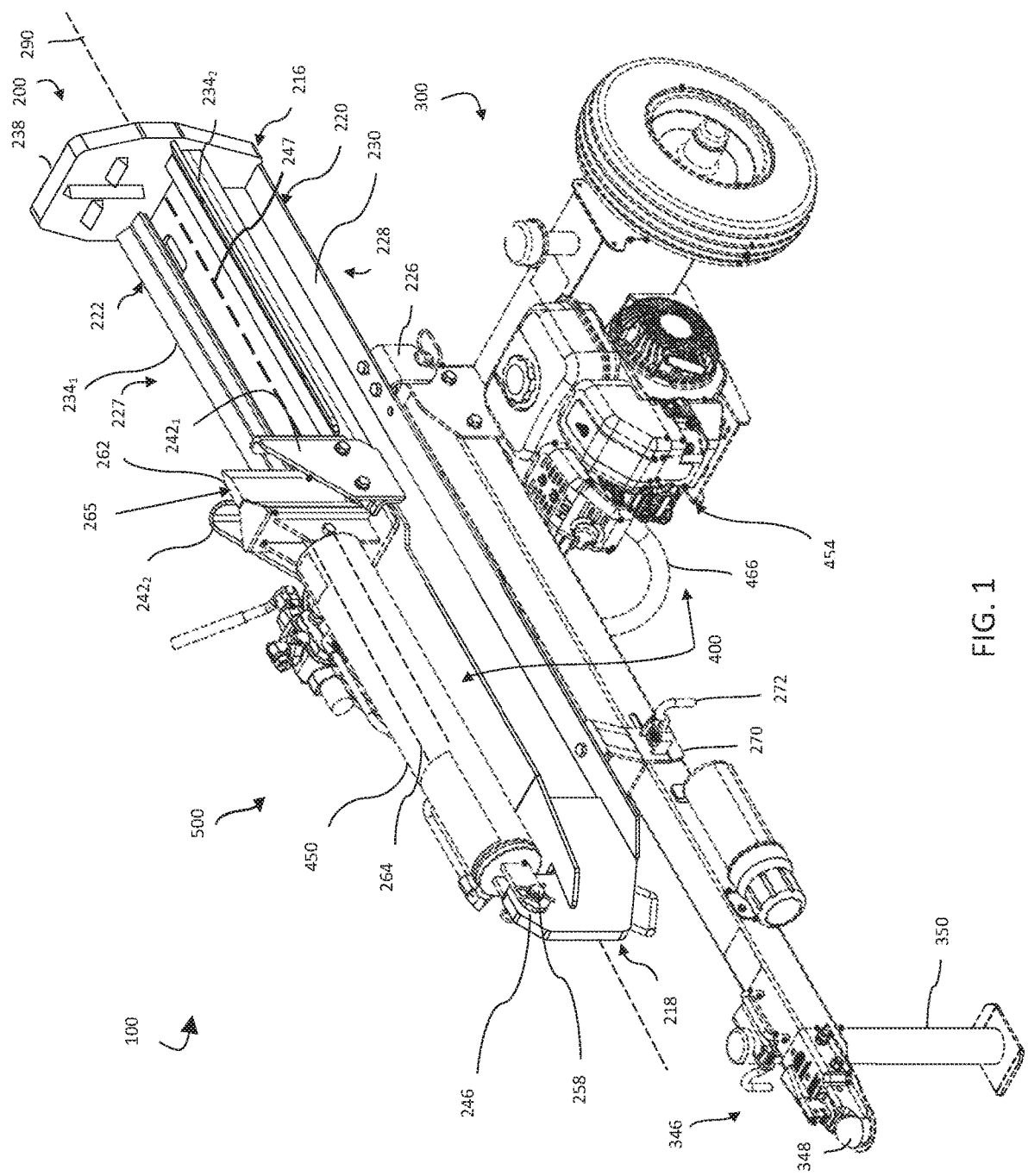
FIG. 1 is a perspective view of a log splitting apparatus.

Before discussing the disclosed system in more detail, initial reference is made to FIG. 1 which presents one representative environment in which the system may be implemented. Broadly, FIG. 1 illustrates a log splitting apparatus 100 that includes a log splitter frame 200 having a support beam 230 (e.g., I-beam or beams of other cross-sections) with opposite first and second ends 216, 218, opposite first and second side portions 220, 222, opposite upper and lower portions 227, 228, and a longitudinal axis 290 extending along a length of the support beam 230 between the first and second opposite ends 216, 218. The log splitting apparatus 100 also includes a trailer (e.g., carriage) 300 to which the log splitter frame 200 is secured (e.g., rigidly or non-movably, pivotally, etc.) and that facilitates transport of the log splitter frame 200 as well as movement of the frame 200 between at least first and second positions, such as horizontal and vertical positions.

A splitting assembly 265 is linearly translatable along a translation axis 247 over the upper portion 227 towards and away from a stop member 238 that is rigidly or non-movably attached to and extending away from the upper portion 227 of the support beam 230 for splitting a log received over the upper portion 227. In one arrangement, the splitting assembly 265 may be in the form of a driven member 262 and a piston 264 connected to the driven member 262. The log splitting apparatus 100 may include any appropriate drive assembly 400 that is configured to drive the piston 264 and the driven member 262 along the translation axis for splitting logs received over the upper portion 227.

For instance, the driven member 262 may be in the form of a blade (e.g., two-way or four-way blade) and the stop member 238 may be in the form of a foot plate (e.g., substantially flat plate including any appropriate gripping members extending therefrom or the like) or vice versa. While the stop member 238 is illustrated as generally being positioned adjacent the first end 216 of the support beam 230, the stop member 238 may in other arrangements be positioned inwardly from the first end 216. Furthermore, and while not shown, the driven member 262 could be in the form of a footplate and the stop member 238 could be in the form of a blade. In one embodiment, the log splitter frame 200 may include first and second cradle members 234₁, 234₂ appropriately secured or securable to the support beam 230 adjacent the upper portion and the first and second side portions 220, 222 that collectively form a cradle for supporting at least one log (not shown) placed thereon or therebetween over the upper portion 227. In one arrangement, first and second stripping brackets or assemblies 242₁, 242₂ may be rigidly attached to and extend away from the support beam 230 (e.g., on the upper portion 227 of the log splitter frame 200 adjacent the first and second side portions 220, 222) for use in dislodging logs from the driven member 262 upon retraction of the piston 262.

As shown, the drive assembly 400 may include a linear actuator in the form of a cylinder 450 (e.g., hydraulic cylinder, etc.) secured to the support beam 230 that is configured to move the piston 264 and driven member 262 in a first direction along translation axis 247 towards the stop member 238 to split a log received over the upper portion 227 and in an opposite second direction to retract the driven member 262 away from the split log and the stop member 238 along translation axis 247. In one arrangement, the support beam 230 may include an anchoring member such as an attachment lug 246 to which an end of the cylinder 250 may be removably secured in any appropriate manner (e.g., via pin 58).

The drive assembly 400 may also include a pump and motor assembly 454 (including a fluid pump that is driven by a motor) that is configured to pump hydraulic fluid from a reservoir through hydraulic lines 466 into one of first and second chambers (not shown) of the hydraulic cylinder 450 (and simultaneously out of the other of the first and second chambers) to correspondingly drive or advance the splitting assembly 265 in either the first or opposite second direction along the translation axis 247. The pump and motor assembly 454 may be powered by any appropriate power source such as a one or more batteries, a gasoline engine, or the like.

A valve assembly 500 may be manipulated by an operator to direct the hydraulic fluid being pumped by the pump and motor assembly 454 into the first chamber of the cylinder 450 (to induce the piston 264 and driven member 262 to move in a first direction along the translation axis 247), the second chamber of the cylinder 450 (to induce the piston 264 and driven member 262 to move in an opposite second direction along the translation axis 247), or into neither of the first or second chambers of the cylinder 450 (so that the piston 264 and driven member 262 do not move in either of the first or second directions along the translation axis 247).

Figure 2:
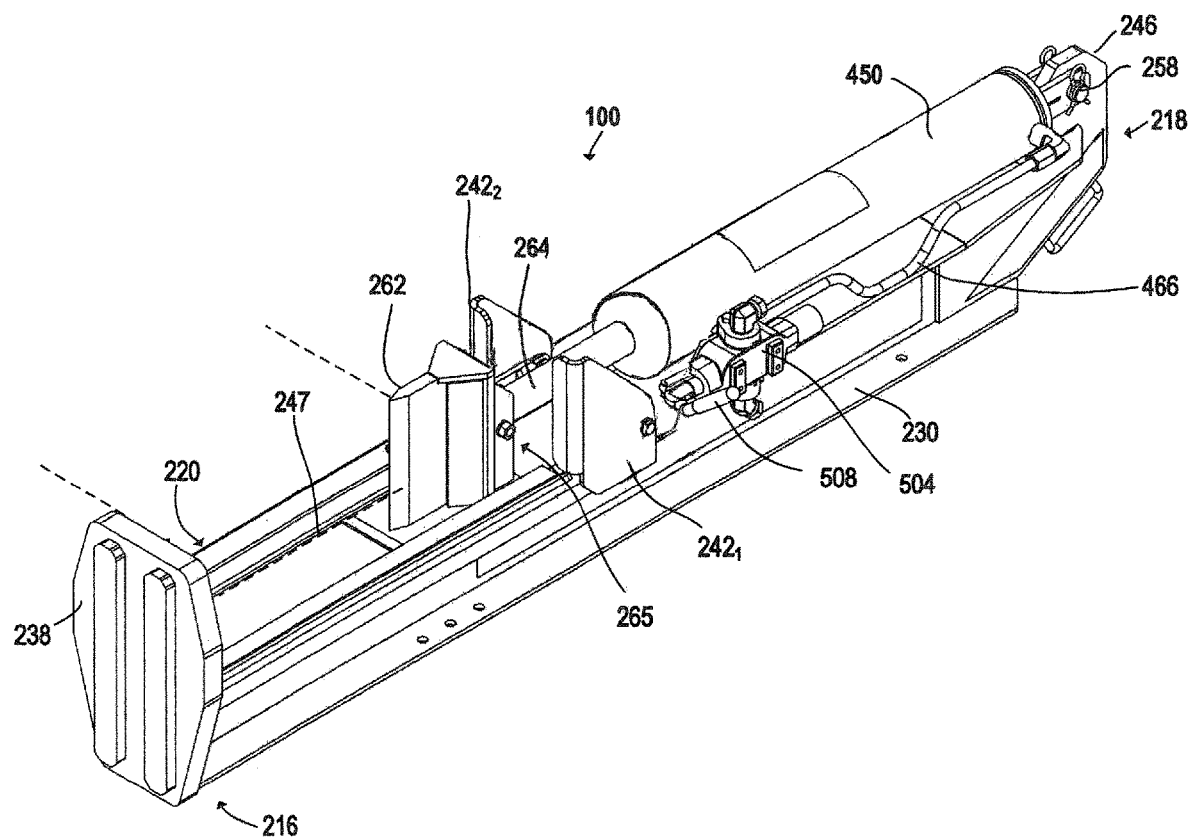
FIG. 2 is another perspective view of the log splitting apparatus with certain portions being removed for clarity.

Turning now to FIG. 2, another perspective view of the log splitting apparatus 100 is presented with various components (e.g., trailer 300, pump and motor assembly 454, etc.) being removed for clarity. In FIG. 2, it can be seen how the valve assembly 500 broadly includes a housing 504 inside of which a valve member (not shown) is movably disposed that is configured to selectively allow fluid from the pump and motor assembly 454 to be directed as set forth above. For instance, the valve member may be movable (e.g., slidable, pivotable) relative to the housing 504 among at least three distinct positions: a) a first position that opens a first series of fluid passageways (not shown) within the housing 504 that allows hydraulic fluid to flow from the pump and motor assembly 454 into the first chamber of the cylinder 450 and from the second chamber of the cylinder 450 to the pump and motor assembly 454 (via hydraulic lines 466 shown in FIGS. 1-2), b) a second position that opens a second series of fluid passageways within the housing 504 that allows hydraulic fluid to flow from the pump and motor assembly 454 into the second chamber of the cylinder 450 and from the first chamber of the cylinder 450 to the pump and motor assembly 454, and c) a third position that opens a third series of fluid passageways within the housing 504 that prevents hydraulic fluid from flowing into either of the first or second chambers of the cylinder 450 (e.g., via directing hydraulic fluid received from the pump and motor assembly 454 back to the pump and motor assembly 454 without directing any hydraulic fluid to the cylinder 450).

The valve assembly 500 may also include at least one triggering member 508 interconnected to the valve member within the housing 504 to allow an operator to selectively move the valve member among the various distinct positions. For instance, the triggering member 508 may be in the form of a handle (e.g., lever) mechanically interconnected to the valve member that may be grasped and manipulated (e.g., pushed, pulled, twisted, or otherwise moved) into at least three distinct positions that respectively correspond to the three distinct positions of the valve member. Alternatively, the triggering member 508 may be in the form of one or more buttons or switches that may be manipulated by a user to induce movement of the valve member into the various distinct positions. For instance, the valve housing 504 and valve member may collectively be in the form of a solenoid valve, where manipulation of the button(s) or switch(s) generates and/or interrupts a current flow to the solenoid valve that moves the movable member into a desired one of the distinct positions. Either of the valve member or the triggering member 508 may be considered a "movable member" of the valve assembly 500.

In existing log splitting apparatuses as discussed previously, the engine and/or motor powering the fluid pump often continue(s) to operate when the operator manipulates the valve assembly to stop the splitting assembly from moving in either of the first or second opposite directions (e.g., when it is in the third position such that pumped fluid from the pump and motor assembly returns to the pump and motor assembly without passing through the cylinder). However, this arrangement results in increased power consumption and noise among other inefficiencies.

Figure 3:
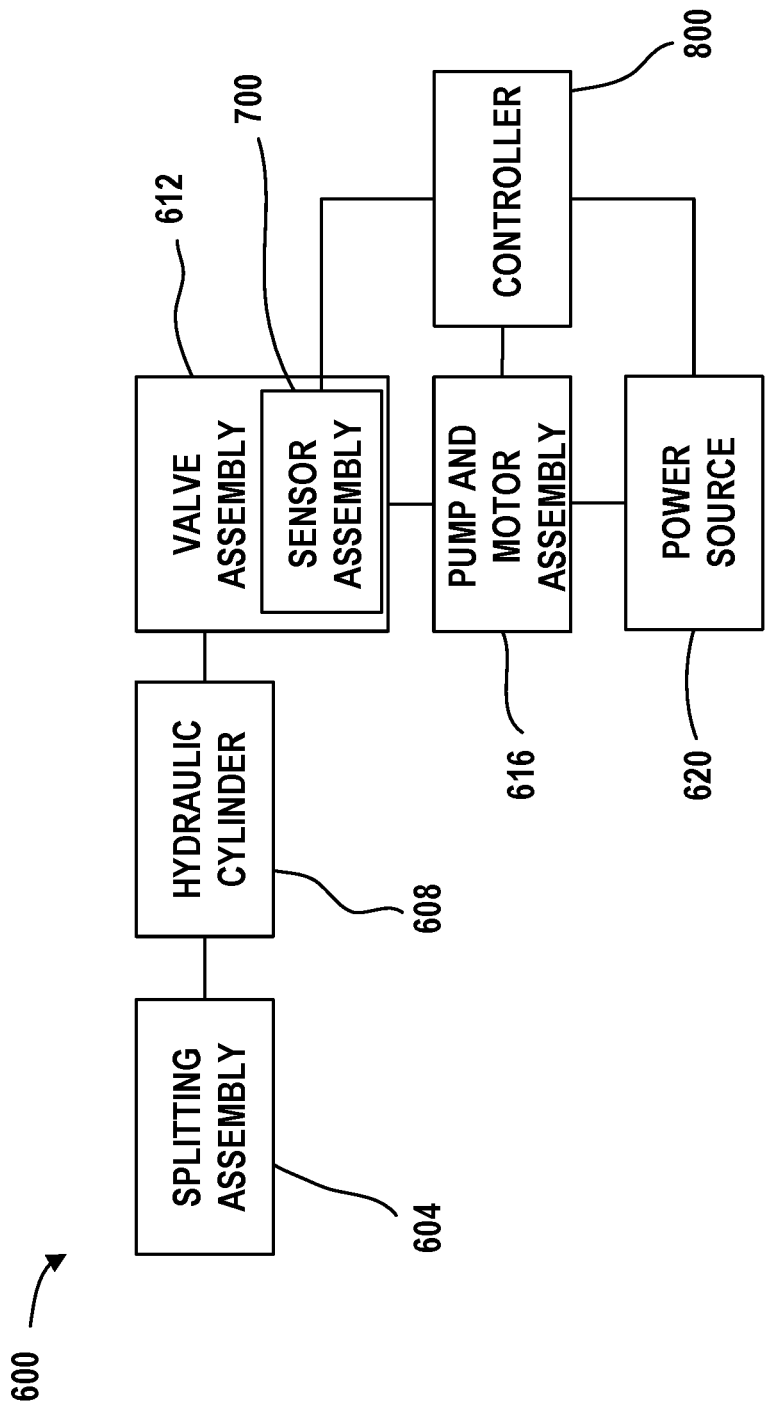
FIG. 3 is a schematic block diagram of a log splitting apparatus that includes a sensor assembly for use in detecting when a valve assembly is in a position that prevents fluid from flowing into either of first or second chambers of a hydraulic cylinder and generating a signal that may be used by a system control to disable the pump and motor assembly from operating.

In this regard, and turning now to FIG. 3, a system 600 is disclosed that is configured to automatically remove power to a pump and motor assembly of a log splitting apparatus when a hydraulic fluid valve assembly has been positioned by an operator to stop the driven member of a splitting assembly from moving in either of first or second opposite directions to thereby stop operation of the pump and motor assembly while the valve assembly is so positioned. Broadly, the system 600 includes a log splitting apparatus (e.g., log splitting apparatus 100 in FIGS. 1-2) having a splitting assembly 604 (e.g., splitting assembly 265 of FIGS. 1-2), a hydraulic cylinder 608 (e.g., hydraulic cylinder 450), a valve assembly 612 (e.g., valve assembly 500), a pump and motor assembly 616 (e.g., pump and motor assembly 454), and a power source 620 (e.g., one or more batteries, gasoline engine, etc.). Not all components of the log splitting apparatus have been shown in FIG. 3 in the interest of clarity.

Furthermore, the valve assembly 612 includes a sensor assembly 700 that is configured to detect different positions of the valve assembly 612 and generate signals that may be processed by a system controller 800 to respectively allow power to flow to or disallow power from flowing to the pump and motor assembly 616 as discussed herein. The disclosed system advantageously results in reduced overall power consumption and noise levels.

Broadly, the sensor assembly 700 is configured to detect when the movable member of the valve assembly 612 (e.g., triggering member 508, valve member inside housing 504, and/or the like) is either in a position to allow hydraulic fluid to flow into the hydraulic cylinder 608 or conversely when the valve assembly 612 is in a position to disallow hydraulic fluid from flowing into the hydraulic cylinder 608, and then generate one or more signals based on the detected conditions. The controller 800 may then receive and process the received signals to allow power from the power source 620 to flow to the pump and motor assembly 616 when the valve assembly 612 is in a position to allow fluid to flow to the hydraulic cylinder 608 (and thus allow the splitting assembly 604 to operate) and to disallow power from the power source 620 from flowing to the pump and motor assembly 616 when the valve assembly 612 is in a position to disallow fluid from flowing to the hydraulic cylinder 608 (and thus disallow the splitting assembly 604 from operating).

When, for example, the sensor assembly 700 is configured to detect that the valve assembly 612 is in a position to allow hydraulic fluid to flow into the hydraulic cylinder 608 and generate one or more corresponding signals for receipt by the controller 700, lack of receipt of such one or more signals from the sensor assembly 700 may trigger the controller 800 to interrupt the supply of power from the power source 620 to the pump and motor assembly 616 to disable the pump and motor assembly 616. Thereafter, subsequent receipt of one or more signals at the controller 800 from the sensor assembly 700 may trigger the controller 800 to allow power from the power source 620 to flow to the pump and motor assembly 616.

Alternatively, when the sensor assembly 700 is configured to detect that the valve assembly 612 is in a position to disallow hydraulic fluid from flowing into the hydraulic cylinder 608 and generate one or more corresponding signals for receipt by the controller 700, receipt of such one or more signals from the sensor assembly 700 may trigger the controller 800 to interrupt the supply of power from the power source 620 to the pump and motor assembly 616 to disable the pump and motor assembly 616. Thereafter, a subsequent lack of receipt of one or more signals from the sensor assembly 700 may trigger the controller 800 to allow power from the power source 620 to flow to the pump and motor assembly 616.

Figure 4:
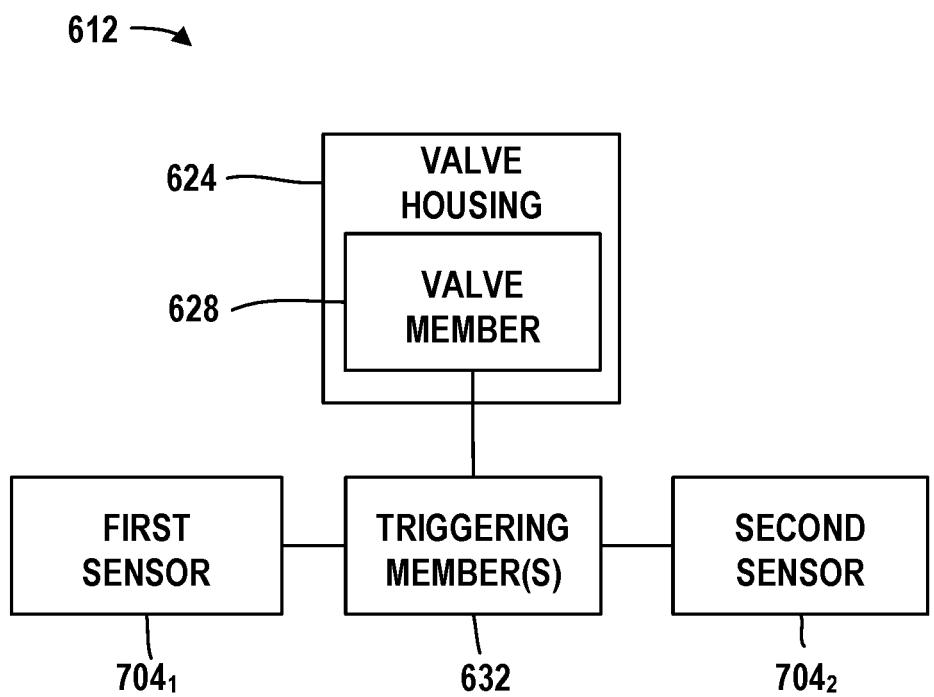
FIG. 4 is a schematic block diagram of the valve assembly of FIG. 3, according to one embodiment.

FIG. 4 illustrates one embodiment of the valve assembly 612 in which a first sensor $704_1$ (of the sensor assembly 700) is configured to detect a first position of the triggering assembly 632 that induces the valve member 628 to allow hydraulic fluid from the pump and motor assembly 616 to flow into a first chamber of the hydraulic cylinder 608 and a second sensor $704_2$ (of the sensor assembly 700) is configured to detect a second position of the triggering assembly 632 that induces the valve member 628 to allow hydraulic fluid from the pump and motor assembly 616 to flow into a second chamber of the hydraulic cylinder 608. As an example, the first sensor $704_1$ may be positioned on the first stripper plate assembly $242_1$ (e.g., see FIG. 2) to detect when the triggering member 632 is in a first position (e.g., clockwise or to the left from the intermediate position of the triggering member 508 shown in FIG. 2) that allows fluid to flow into a first chamber of the cylinder 608 (e.g., cylinder 250) and the splitting assembly 604 (e.g., splitting assembly 265) to move towards the stop member 238. The second sensor $704_2$ may, for instance, be positioned on the valve housing 624 (e.g., valve housing 504 of FIG. 2) to detect when the triggering member 632 is in a second position (e.g., counterclockwise or to the right from the intermediate position of the triggering member 508 shown in FIG. 2) that allows fluid to flow into a second chamber of the cylinder 608 and the splitting assembly 265 to retract away from the stop member 238. As another example, the first and second sensors $704_1$, $704_2$ could be located on different respective positions along the support beam 230.

While not illustrated in FIG. 4, the sensor assembly 700 may in one embodiment include only a single sensor 704 that is configured to detect when the triggering member 632 is in a third position (e.g., in the intermediate position of the triggering member 508 shown in FIG. 2) that disallows fluid from flowing into either of the first or second chambers of the cylinder 608 and thereby disallows the splitting assembly 265 from moving toward or away from the stop member 238. Alternatively, the sensor assembly 700 could have three different sensors 704 that are configured to respectively detect when the trigging assembly 632 has been positioned in one of the above-mentioned three positions. Still further, the sensor assembly 700 could be in the form of a single sensor 704 that is configured to detect when the trigging assembly 632 has been positioned in any one of the above-mentioned three positions.

Figure 5:
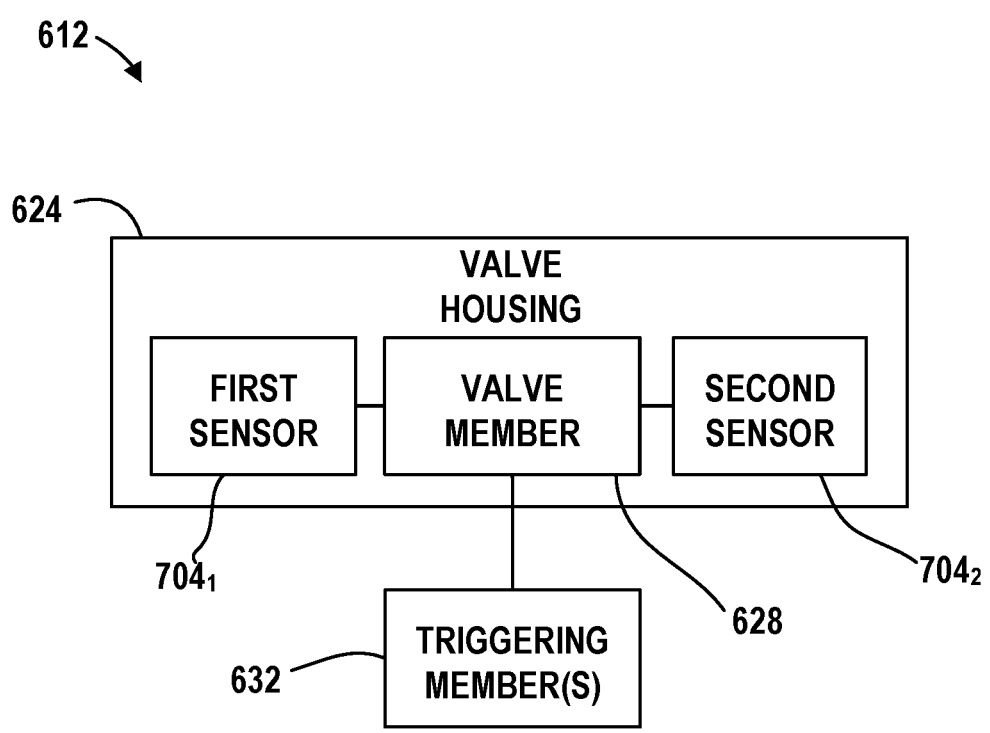
FIG. 5 is a schematic block diagram of the valve assembly of FIG. 3, according to another embodiment.

FIG. 5 illustrates another embodiment of the valve assembly 612 in which a first sensor $704_1$ (of the sensor assembly 700) is configured to detect a first position of the valve member 628 within the valve housing 624 that allows hydraulic fluid from the pump and motor assembly 616 to flow into the first chamber of the hydraulic cylinder 608 and a second sensor $704_2$ (of the sensor assembly 700) is configured to detect a second position of the valve member 628 within the valve housing 624 that allows hydraulic fluid from the pump and motor assembly 616 to flow into the second chamber of the hydraulic cylinder 608. As an example, the first and second sensors $704_1$, $704_2$ could be located on different respective positions inside and/or outside of the valve housing 624 and appropriately configured to detect the first and second positions of the valve member 628. Additionally or alternatively, a sensor 704 could be positioned to detect an intermediate position of the valve member 628 that blocks the flow of fluid into the cylinder 608.

The one or more sensors of the sensor assembly 700 may be of any appropriate type such as, but not limited to, hall-effect sensors, proximity sensors, optical sensors, rotary encoders, and/or the like. Furthermore, the sensor assembly 700 may be configured to generate and transmit the various one or more signals to the controller 800 in any appropriate wired or wireless manner.

In one arrangement, the one or more sensors 704 of the sensor assembly 700 may each be in the nature of an electric switch that forms part of an electric circuit with the power source 620 and that is thus configured to selectively allow or interrupt the supply of power from the power source 620 to the pump and motor assembly 616 (e.g., without signal processing by the system controller). As an example in the embodiment of FIG. 4 in which the first and second sensors $704_1$, $704_2$ are configured to respectively detect the first and second positions of the triggering member 632, power may be configured to flow from the power source 620 to the pump and motor assembly 616 when either of the first and second sensors $704_1$, $704_2$ detects its respective first or second position but not flow from the power source 620 to the pump and motor assembly 616 when neither of the first and second sensors $704_1$, $704_2$ detects its respective first or second position. In the case where the sensor assembly 700 includes a single sensor 704 that is configured to detect only the intermediate ("off") position of the triggering member 632 or valve member 628, the sensor 704 may not allow power to flow from the power source 620 to the pump and motor assembly 616 when it detects the off position but otherwise allow power to flow from the power source 620 to the pump and motor assembly 616 when it does not detect the off position. Various other arrangements are envisioned and encompassed herein.

Any computer readable program instructions (e.g., logic) executed by the controller 800 (e.g., as part of receiving one or more signals from the sensor assembly 700 and allowing or disallowing power flow to the pump and motor assembly 616 as discussed herein) may be implemented as one or more computer program products, i.e., one or more modules of computer program instructions encoded on a computer-readable medium for execution by, or to control the operation of, data processing apparatus(es) (e.g., processors, cores, etc.). The computer-readable medium can be a machine-readable storage device, a machine-readable storage substrate, a memory device, a composition of matter affecting a machine-readable propagated signal, or a combination of one or more of them. In addition to hardware, code that creates an execution environment for the computer program in question may be provided, e.g., code that constitutes processor firmware, a protocol stack, a database management system, an operating system, or a combination of one or more of them.

While this specification contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The embodiments described hereinabove are further intended to explain best modes known of practicing the invention and to enable others skilled in the art to utilize the invention in such, or other embodiments and with various modifications required by the particular application(s) or use(s) of the invention. It is intended that the appended claims be construed to include alternative embodiments to the extent permitted by the prior art.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the disclosure herein.

What is claimed is:

1. An apparatus for splitting logs, comprising:
    a frame including a cradle disposed over an upper portion thereof for receiving a log;
    a splitting assembly that is linearly translatable over the upper portion of the frame along a translation axis in a first direction for use in splitting a log received in the cradle and in an opposite second direction;
    a hydraulic cylinder relative to which a piston is configured to linearly translate to induce linear translation of the splitting assembly;
    a pump and motor assembly interconnected with the cylinder to pump hydraulic fluid into a first chamber of the cylinder to translate the piston in the first direction and into a second chamber of the cylinder to translate the piston in the second direction;
    a power source interconnected with the pump and motor assembly;
    a valve assembly interconnected with the hydraulic cylinder and including:
        a movable member that is positionable in a) a first position to allow hydraulic fluid to flow from the pump and motor assembly into the first chamber of the hydraulic cylinder and from the second chamber of the hydraulic cylinder to the pump and motor assembly, b) a second position to allow hydraulic fluid to flow from the pump and motor assembly into the second chamber of the hydraulic cylinder and from the first chamber of the hydraulic cylinder to the pump and motor assembly, and c) a third position that prevents hydraulic fluid from flowing into either of the first or second chambers of the hydraulic cylinder; and
        a sensor assembly, positioned relative to the movable member, that is configured to detect when the movable member is in a) the first or second positions, or b) the third position and generate a signal based on the detection; and
    a system controller that is configured to allow the power source to send power to the pump and motor assembly or disallow the power source from sending power to the pump and motor assembly based on the signals generated by the sensor assembly.

2. The apparatus of claim 1, wherein the valve assembly includes:
    a housing;
    a valve member disposed within the housing, wherein the valve member is positionable in the first, second, and third positions relative to the housing; and
    a triggering assembly interconnected to the valve member and manipulatable by a user to position the valve member in one of the first, second, or third positions relative to the housing, wherein the movable member is one of the valve member or the triggering assembly.

3. The apparatus of claim 2, wherein the sensor assembly includes a first sensor positioned adjacent the first position of the valve member and a second sensor positioned adjacent the second position of the valve member, wherein the first and second sensors generate respective signals for receipt by the controller when the valve member is in one of its first and second positions.

4. The apparatus of claim 2, wherein the triggering assembly is positionable in first and second positions to correspondingly position the valve member in its first and second positions, wherein the sensor assembly includes a first sensor positioned adjacent the first position of the triggering assembly and a second sensor positioned adjacent the second position of the triggering assembly, wherein the first and second sensors generate respective signals for receipt by the controller when the triggering assembly is in one of its first and second positions.

5. The apparatus of claim 2, wherein the sensor assembly includes a first sensor positioned adjacent the third position of the valve member, wherein the first sensor generates a signal for receipt by the controller when the valve member is in its third position.

6. The apparatus of claim 2, wherein the triggering assembly is positionable in first, second, and third positions to correspondingly position the valve member in its first, second, and third positions, wherein the sensor assembly includes a first sensor positioned adjacent the third position of the triggering assembly, and wherein the first sensor generates a signal for receipt by the controller when the triggering assembly is in its third position.

7. The apparatus of claim 1, wherein the sensor assembly includes one or more hall-effect sensors, proximity sensors, or piezoelectric sensors.

8. The apparatus of claim 2, wherein the triggering assembly includes one or more handles, switches, or buttons.

9. The apparatus of claim 1, wherein the power source is at least one battery bank.

10. A method of using a log splitting apparatus, comprising:
   first ascertaining, by a system controller of a log splitting apparatus, that a valve assembly of the apparatus is in a position that inhibits hydraulic fluid from being pumped from a fluid pump into a hydraulic cylinder that is configured to drive a splitting assembly over an upper portion of a frame of the apparatus; and
   disallowing, by the system controller in response to the first ascertaining, power from being supplied to a motor that drives the fluid pump.

11. The method of claim 10, wherein the first ascertaining includes:
   receiving, at the system controller, a signal from a sensor attached to or adjacent the valve assembly, that the valve assembly is in the position that inhibits hydraulic fluid from being pumped from the fluid pump into the hydraulic cylinder.

12. The method of claim 10, wherein the first ascertaining includes:
   determining, by the system controller, that a signal from a sensor attached to or adjacent the valve assembly has not been received.

13. The method of claim 10, further including after the disallowing: second ascertaining, by the system controller, that the valve assembly is in a position that allows hydraulic fluid to be pumped from the fluid pump into the hydraulic cylinder; and allowing, by the system controller in response to the second ascertaining, power to be supplied to the motor.

14. The method of claim 13, wherein the second ascertaining includes:
   determining, by the system controller, that a signal from a sensor attached to or adjacent the valve assembly has not been received.

15. The method of claim 13, wherein the second ascertaining includes:
   receiving, at the system controller, a signal from a sensor attached to or adjacent the valve assembly, that the valve assembly is in the position that inhibits hydraulic fluid from being pumped from the fluid pump into the hydraulic cylinder.

* * * * *